US010455222B2

(12) United States Patent
Felip Leon et al.

(10) Patent No.: US 10,455,222 B2
(45) Date of Patent: Oct. 22, 2019

(54) TECHNOLOGIES FOR AUTONOMOUS THREE-DIMENSIONAL MODELING

(71) Applicant: Intel Corporation, Santa Clara, CA (US)

(72) Inventors: Javier Felip Leon, Portland, OR (US); David I. Gonzalez Aguirre, Hillsboro, OR (US); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 15/473,930

(22) Filed: Mar. 30, 2017

(65) Prior Publication Data
US 2018/0286119 A1 Oct. 4, 2018

(51) Int. Cl.
| G06T 17/00 | (2006.01) |
| H04N 13/296 | (2018.01) |
| G01L 5/00 | (2006.01) |
| B25J 13/08 | (2006.01) |
| H04N 13/106 | (2018.01) |
| H04N 13/207 | (2018.01) |
| G01G 19/52 | (2006.01) |
| G01B 11/24 | (2006.01) |
| B25J 9/00 | (2006.01) |
| B25J 9/04 | (2006.01) |
| B25J 15/10 | (2006.01) |
| B25J 19/02 | (2006.01) |
| H04N 13/271 | (2018.01) |

(52) U.S. Cl.
CPC .......... *H04N 13/296* (2018.05); *B25J 9/0096* (2013.01); *B25J 9/046* (2013.01); *B25J 13/085* (2013.01); *B25J 15/103* (2013.01); *B25J 19/023* (2013.01); *G01B 11/24* (2013.01); *G01G 19/52* (2013.01); *G01L 5/00* (2013.01); *H04N 13/106* (2018.05); *H04N 13/207* (2018.05); *H04N 13/271* (2018.05)

(58) Field of Classification Search
None
See application file for complete search history.

(56) References Cited

U.S. PATENT DOCUMENTS 6,912,293 B1 *  6/2005  Korobkin ................ G06T 15/20
                                                345/420
7,512,459 B2 *  3/2009  Watanabe .............. B25J 9/1664
                                                345/419

(Continued)

*Primary Examiner* — Martin Mushambo
(74) *Attorney, Agent, or Firm* — Barnes & Thornburg LLP

(57) ABSTRACT

An autonomous object modeler includes a modeling table, a controllable arm, a depth camera attached to the controllable arm, and a controller to control operation of the modeling table, the controllable arm, and the depth camera. The modeling table may be movable and includes a mass sensor to produce mass sensor data indicative of a mass of an object positioned on the modeling table. The controllable arm includes a force-torque sensor to produce force-torque sensor data indicative of an inertia of the object while the object is moved by the controllable arm. The controller is configured to control operation of the controllable arm to reposition the object on the modeling table to generate three-dimensional models of the object. The three-dimensional models include the mass data and the inertia data.

25 Claims, 9 Drawing Sheets

(56) References Cited

U.S. PATENT DOCUMENTS

| | | | |
|---|---|---|---|
| 9,393,693 B1* | 7/2016 | Kalakrishnan | B25J 9/1671 |
| 9,486,927 B1* | 11/2016 | Morey | B25J 15/10 |
| 2003/0090483 A1* | 5/2003 | Watanabe | B25J 9/1671 |
| | | | 345/419 |
| 2005/0004709 A1* | 1/2005 | Watanabe | B25J 9/1664 |
| | | | 700/245 |
| 2005/0128197 A1* | 6/2005 | Thrun | G01B 21/20 |
| | | | 345/421 |
| 2008/0259073 A1* | 10/2008 | Lowe | G06T 15/20 |
| | | | 345/419 |
| 2010/0156896 A1* | 6/2010 | Ichimura | G01B 11/245 |
| | | | 345/419 |
| 2013/0006422 A1* | 1/2013 | Komatsu | B25J 9/1638 |
| | | | 700/258 |
| 2013/0182903 A1* | 7/2013 | Nammoto | G06K 9/00664 |
| | | | 382/103 |
| 2014/0092088 A1* | 4/2014 | Hutchison | G06T 11/206 |
| | | | 345/420 |
| 2014/0114479 A1* | 4/2014 | Okazaki | B25J 13/085 |
| | | | 700/253 |
| 2016/0199981 A1* | 7/2016 | Atohira | B25J 9/1671 |
| | | | 700/248 |
| 2017/0028561 A1* | 2/2017 | Yamada | B25J 9/1697 |
| 2018/0036882 A1* | 2/2018 | Kimura | B25J 9/1664 |
| 2018/0255283 A1* | 9/2018 | Li | H04N 13/128 |

* cited by examiner

```
<INERTIAL>
    <!-- OBJECT CENTER OF MASS COORDINATES WRT LOCAL OBJECT COORDINATES IN METERS -->
    <ORIGIN RPY = "0 0 0" XYZ = "-0.022  0.0203  0.02917"/>
    <!-- OBJECT MASS VALUE IN KG -->
    <MASS VALUE = "0.56"/>
    <!-- INERTIA 3X3 MATRIX -->
    <INERTIA IXX = "0.004878" IXY = "-6.2341E-07" IXZ = "-7.4538E-07" IYY = "0.00090164" IYZ = "-0.00014394" IZZ = "0.0042946" />
</INERTIAL>
```

FIG. 7

TECHNOLOGIES FOR AUTONOMOUS THREE-DIMENSIONAL MODELING

BACKGROUND

Object models are used for many different applications such as gaming, computer graphics, augmented reality (AR), virtual reality (VR), prototyping, robotics, architecture, and design. For example, in AR and VR applications, the familiarity of daily object models is exploited to provide a user a more realistic experience. Models of objects can be acquired directly by the original computer-aided design (CAD), manual modeling, or using three-dimensional (3D) scanning techniques. However, the original CAD models are not often provided by the manufacturer and may also not account for real-word deformations, defects, or other manufacturing differences. Manual modeling can be time-intensive and may require experts in the field to measure and model free-form objects. Present day 3D scanning solutions may provide increased accuracy and cost efficiencies in generating 3D model of objects.

Typical 3D scanning techniques utilize a camera to scan the object. One difficulty that can occur with such 3D scanning techniques is the inability to map occluded surfaces of the object. Any occluded surface has an unknown geometry and could include cavities, protuberances, or complex topology patches. Those unknown surfaces can result in an inaccurate modelling of the object. Accordingly, numerous algorithms have been developed in an attempt to remedy such deficiencies of the 3D scanning process. For example, various signal and image processing filters have been leveraged to smooth out noise and fill depth holes.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is an illustrative embodiment of a software description of data of a modeled object that may be appended to an object model.

DETAILED DESCRIPTION OF THE DRAWINGS

Figure 1:
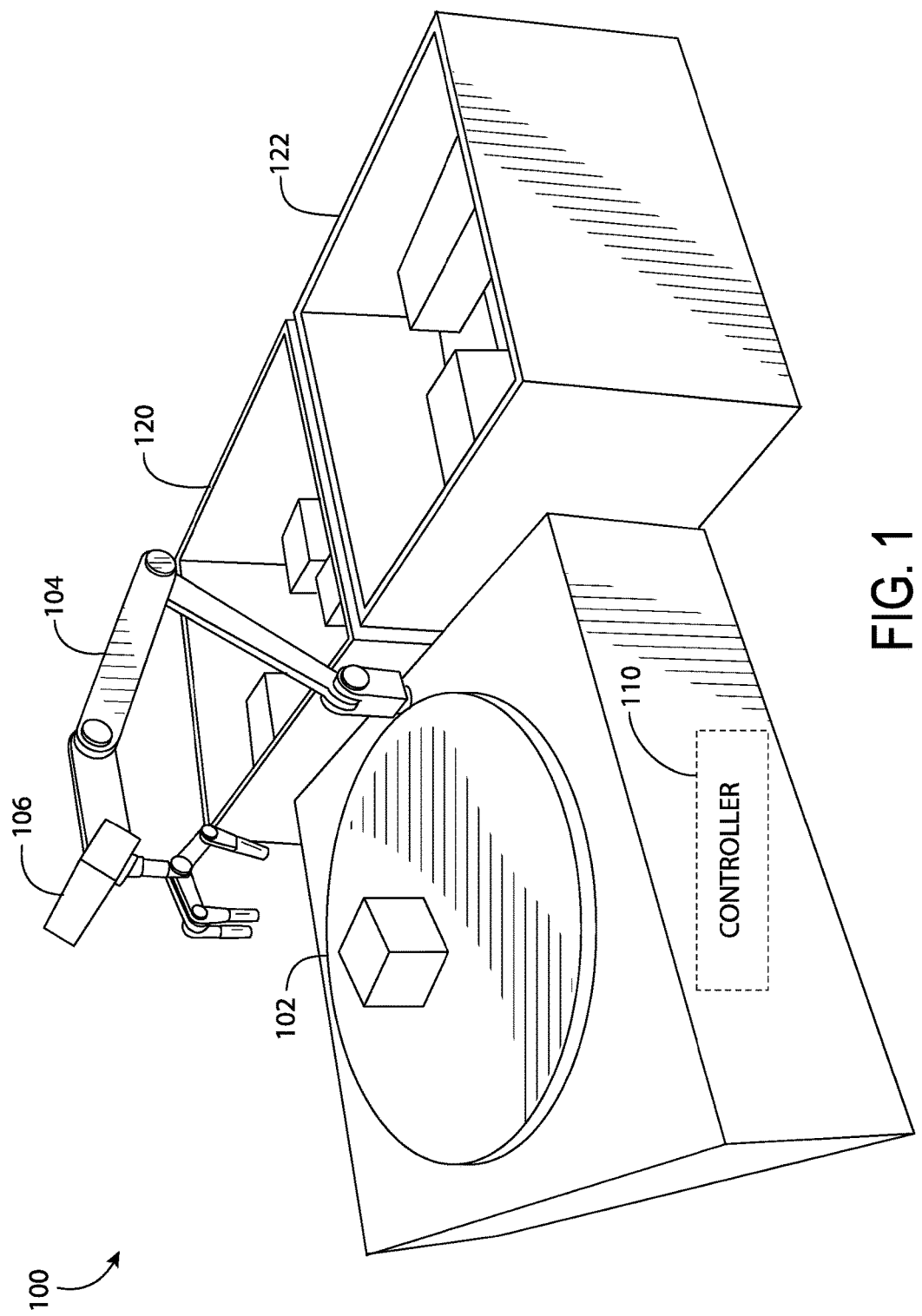
FIG. 1 is a perspective view of at least one embodiment of an autonomous object modeler.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative autonomous object modeler 100 includes a modeling table or surface 102, a controllable arm 104 having a depth camera 106 mounted thereon, and a controller 110. In use, as discussed in more detail below, an object to be modeled may be placed on the modeling table 102. The controller 110 controls the depth camera 106 to capture three-dimensional images, from which a three-dimensional model of the object may be generated as discussed in more detail below. To ensure as many surfaces of the object are captured and modelled, the controller 110 is configured to change camera viewpoint of the object by autonomously changing the position of the depth camera 106, autonomously rotating the modeling table 102, and/or autonomously repositioning the object on the modeling table 102. Additionally, in some embodiments, the autonomous object modeler 100 may be used to form an "assembly line" of object modeling. In such embodiments, the controller 110 is configured to control the movement of the controllable arm 104 to move an object from an input bin 120 to the modeling table 102 for modeling of the object, and from the modeling table 102 to the an output bin 122 when the modeling is completed. The autonomous object modeler 100 may then move the next object to be modeled from the input bin 120 to the modeling table 102 and so forth.

Figure 2:
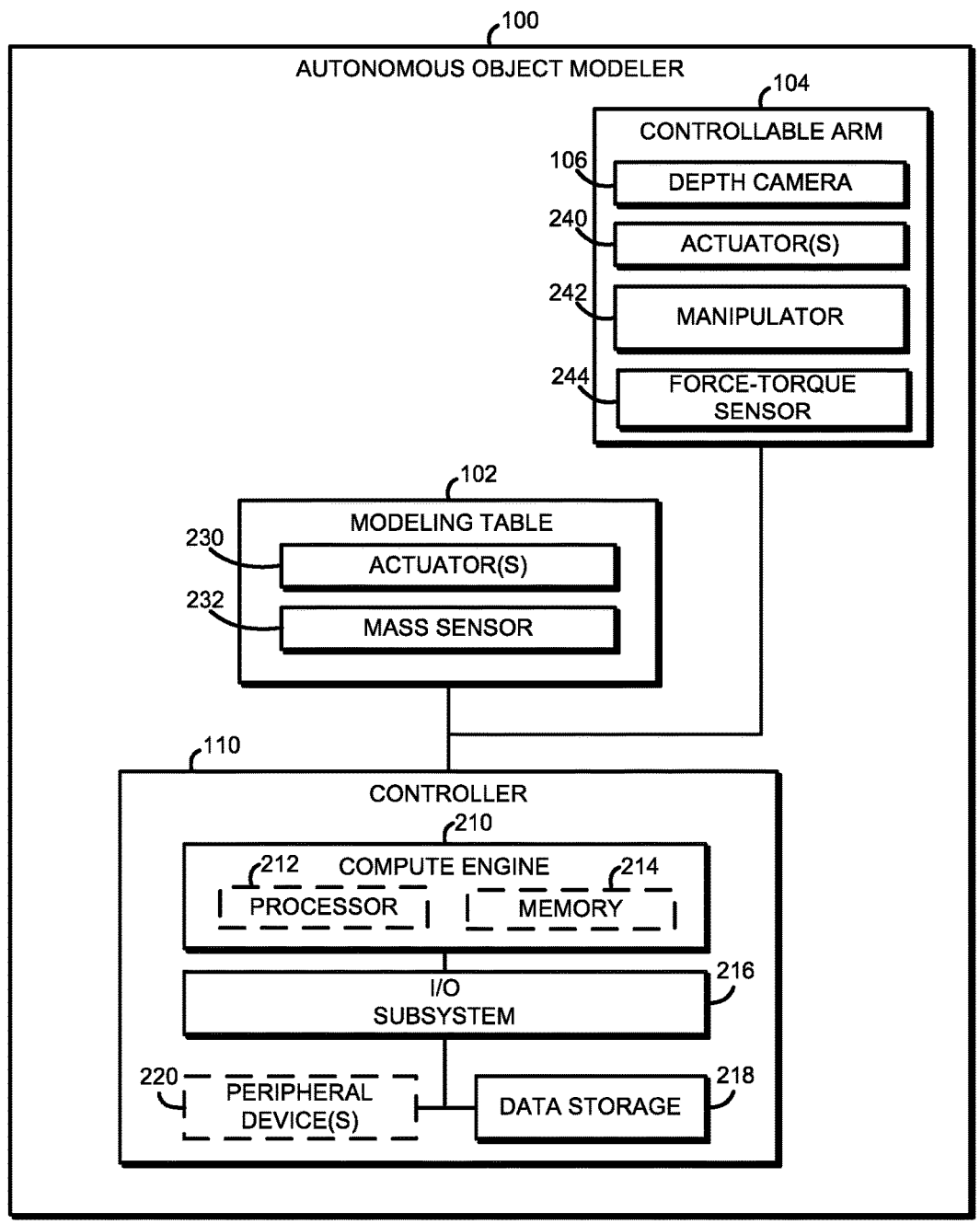
FIG. 2 is a simplified block diagram of the autonomous object modeler of FIG. 1.

Referring now to FIG. 2, as discussed above, the illustrative autonomous object modeler 100 for autonomous 3-dimensional (3D) modeling with augmented data (e.g., mass, center of mass, and inertia data) includes the modeling table 102, the controllable arm 104 with the depth camera 106, and the controller 110. The modeling table 102 is configured to provide a surface to support object to be modeled while the depth camera 106 capture 3D images of the object. Of course, it should be appreciated that when the depth camera 106 is positioned at a fixed angle and distance relative to the object, the depth camera 106 may be unable to accurately capture the depth of certain portions (e.g., one or more occluded surfaces) of the object. As such, in the illustrative embodiment, the modeling table 102 includes one or more actuators 230 that are controllable to move or rotate the modeling table 102 to provide different viewpoints of the object to the depth camera 106. It should be appreciated that the rotation angle is controlled by the controller 110 as discussed below. Additionally, in the illustrative embodiment, the modeling table 102 further includes a mass sensor 232 that produces mass sensor data indicative of the mass of the object positioned on the modeling table 102. In some embodiments, the determined mass of the object may appended or incorporated in the final 3D model of the object as discussed in more detail below.

The controllable arm 104 is configured to move the depth camera 106 to various viewpoints of the object, as well as reposition the object on the modelling table 102 to new or additional positions to allow the depth camera 106 to capture 3D images of occluded or unknown surfaces of the object. To do so, the illustrative controllable arm 104 includes the depth camera 106 mounted thereon, one or more actuators 240, a manipulator 242, and a force-torque sensor 244. As discussed above, the depth camera 106 is configured to capture depth images of the object positioned on the modeling table 102. The depth camera 106 may be embodied as any imaging device, component, or collection thereof capable of capturing images and/or video having a depth channel. In the illustrative embodiment, the depth camera 106 is embodied as a three-dimensional (3D) camera capable of capturing color images including a depth image, channel, or stream. For example, the depth camera 106 may have an RGBD (red-green-blue-depth) sensor or a similar camera sensor that may capture images having four channels—a depth channel and three color channels (i.e., non-depth channels). It should be appreciated that the color values of the image may be represented in another way (e.g., grayscale, HSL, HSV, etc.). Further, in some embodiments, the controllable arm 104 may include a camera having a sensor configured to capture two-dimensional (2D) images (e.g., color images) and another separate sensor configured to capture depth. In some embodiments, the camera 118 is embodied as an Intel® RealSense™ camera (e.g., an Intel® RealSense™ model R100 or R200). Although only one depth camera 106 is shown in the illustrative embodiment, it should be appreciated that that autonomous object modeler may include additional depth cameras in other embodiments.

It should be appreciated that the depth camera 106 may determine depth measurements of objects in a scene in a variety of ways depending on the particular depth camera 106 used. For example, the depth camera 106 may include an infrared (IR) projector and an IR sensor such that the IR sensor estimates depth values of objects in the scene by analyzing the IR light pattern projected on the scene by the IR projector. In another embodiment, the depth camera 106 includes at least two lenses and corresponding sensors configured to capture images from at least two different viewpoints of a scene (e.g., a stereo camera). Based on those viewpoints, the controller 110 may calculate a distance of objects in the captured scene.

It should be appreciated that the depth camera 106 may be unable to accurately capture the depth of certain portions of the object in the scene due to a variety of factors (e.g., occlusions, IR absorption, noise, and distance) at a given fixed position. As such, the controller 110 may control the one or more actuators 240 to move the controllable arm 104 to reposition the depth camera 106 relative to the object and thereby change the viewpoint of the object. Additionally, the controller 110 may control activation of the manipulator 242 to grasp and reposition the object on the modeling table such that occluded surfaces of the object that are not viewable by movement of the modeling table 102 and/or the depth camera 104 can be exposed to the depth camera 106. The manipulator 242 may be embodied as any type of device or devices capable of grasping an object. In the illustrative embodiment, the manipulator 242 is embodied as a figure-like structure positioned at the end of the controllable arm 104 as illustrated in FIG. 1.

The force-torque sensor 244 may be embodied as any type of sensor or sensing circuit or device capable of producing force-torque sensor data indicative of an inertia of the object while the object is moved by the controllable arm 104. As discussed in detail below, the force-torque sensor data and the movement of the object are used to estimate a center of mass and an inertia matrix of the object. Similar to the mass measurement of the object, the center of mass and inertia matrix may be appended to, or incorporated in, the three-dimensional model. Additionally, it should be appreciated that the determined center of mass may be used to determine contact points on the object to facilitate securing grasping of the object by the controllable arm 104.

The controller 110 may be embodied as any type of computer or compute device capable of controlling operation of the modeling table 102, the controllable arm 104, and the depth camera 106 to generate a complete 3D model of an object placed on the modeling table 102. As shown in FIG. 2, the illustrative controller 110 includes a compute engine 210, an input/output ("I/O") subsystem 216, and a data storage 218. In some embodiments, the controller 110 may further include one or more peripheral devices 220. It should be appreciated that the controller 110 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 210 may be embodied as any type of device or collection of devices capable of performing the various compute functions as described below. In some embodiments, the compute engine 210 may be embodied as a single device such as an integrated circuit, an embedded system, a field-programmable-array (FPGA, a system-on-a-chip (SOC), or other integrated system or device. Additionally, in some embodiments, the compute engine 210 may include, or is embodied as, a processor 212 and memory 214. The processor 212 may be embodied as any type of processor capable of performing the functions described herein. For example, the processor 212 may be embodied as a single or multi-core processor(s), digital signal processor, microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the controller 110 such as operating systems, applications, programs, libraries, and drivers. The memory 214 is communicatively coupled to the processor 212 via the I/O subsystem 216, which may be embodied as circuitry and/or components to facilitate input/output operations with the processor 212, the memory 214, and other components of the controller 110. For example, the I/O subsystem 216 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 216 may be incorporated, along with the processor 212, the memory 214, and other components of the controller 110, into the compute engine 210.

The data storage 218 may be embodied as any type of device or devices configured for short-term or long-term storage of data such as, for example, memory devices and circuits, memory cards, hard disk drives, solid-state drives, or other data storage devices. As discussed in detail below, the controller 110 may store point cloud model data generated by the depth camera 106 during the modeling process and/or the finalized 3D mesh models of the object, which include the mass and inertia data as discussed below.

The peripheral devices 220 may include any number of additional peripheral or interface devices, such as other input/output devices, storage devices, and so forth. The particular devices included in the peripheral devices 220 may depend on, for example, the type and/or configuration of the controller 110, the modeling table 102, and/or the controllable arm 104.

Figure 3:
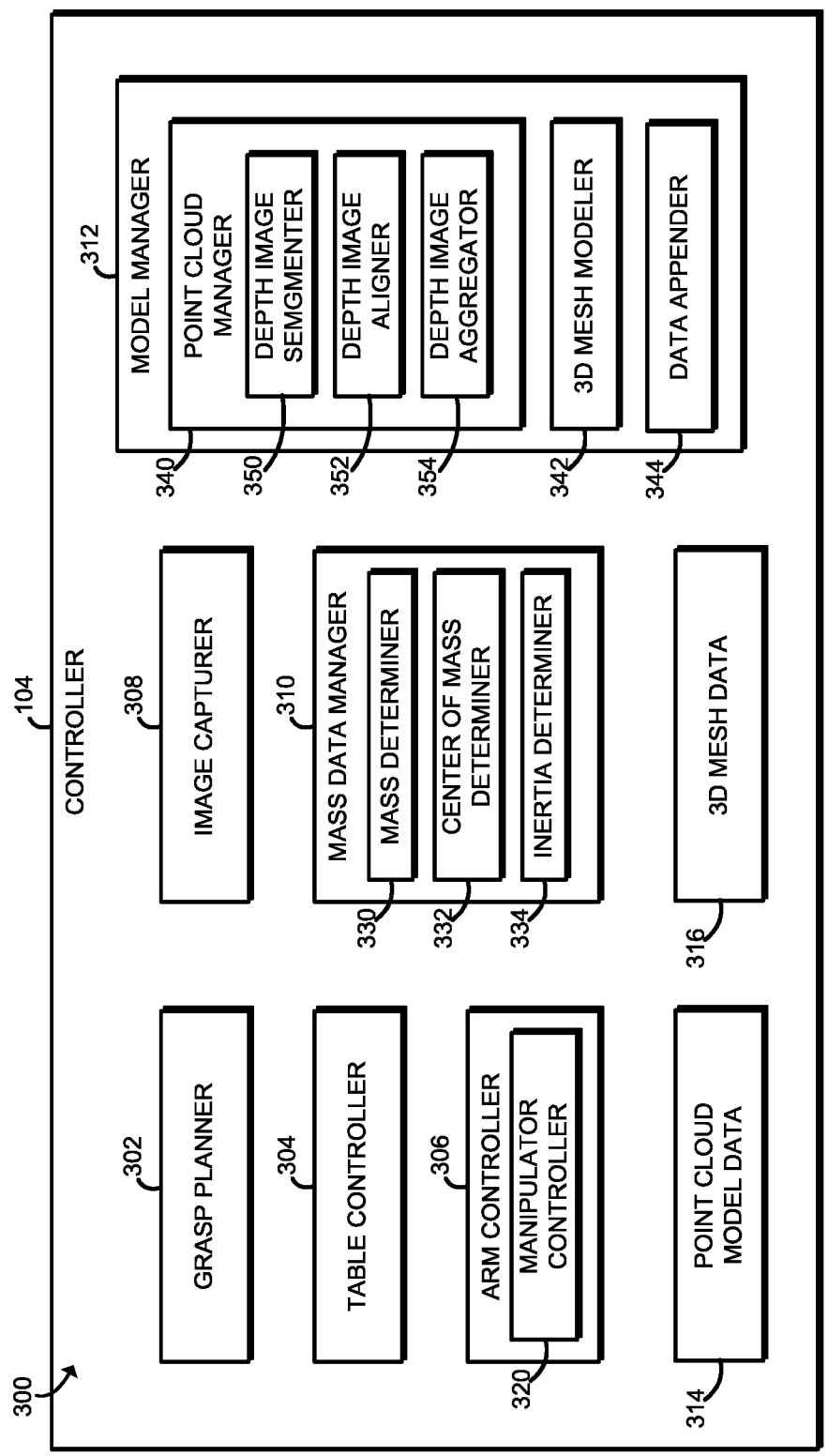
FIG. 3 is a simplified block diagram of an environment that may be established by a controller of the autonomous object modeler of FIGS. 1 and 2.

Referring now to FIG. 3, in use, the controller 110 of the autonomous object modeler 100 establishes an environment 300 for controlling the modeling table 102, the controllable arm 104, and the depth camera 106 to generate 3D model of a modeled object position on the modeling table 102. The environment 300 in the illustrative embodiment includes a grasp planner 302, a table controller 304, an arm controller 306, an image capturer 308, a mass data manager 310, a model manager 312, point cloud model data 314, and 3D mesh model data 316.

The various components of the environment 300 may be embodied as hardware, firmware, software, or a combination thereof. As such, in some embodiments, one or more of the components of the environment 300 may be embodied as circuitry or collection of electrical devices (e.g., a grasp planner circuit 302, a table controller circuit 304, an arm controller circuit 306, an image capturer circuit 308, a mass data manager circuit 310, a model manager circuit 312, etc.). It should be appreciated that, in such embodiments, one or more of the grasp planner circuit 302, the table controller circuit 304, the arm controller circuit 306, the image capturer circuit 308, the mass data manager circuit 310, and/or the model manager circuit 312 may form a portion of one or more of the compute engine 210, the processor 212, the I/O subsystem 216, and/or other components of the controller 110. Additionally, in some embodiments, one or more of the illustrative components of the environment 300 may form a portion of another component and/or one or more of the illustrative components may be independent of one another.

Further, in some embodiments, one or more of the components of the environment 300 may be embodied as virtualized hardware components or emulated architecture, which may be established and maintained by the compute engine 210 or other components of the controller 110.

The grasp planner 302 is configured to determine and/or plan the movements of the controllable arm 104 required to grasp and move the object being modeled from its present position to a new position. The grasp plan may, for example, define a trajectory of the controllable arm 104 and contact points of the object to be grasped to allow repositioning of the object from a present position on the modeling table 102 to a new position on the modeling table 102, which may provide the depth camera 106 view of a previously-occluded surface of the object. For example, the controllable arm 104 may follow a planned trajectory to approach the object such that the manipulator 242 may grasp the object at the exact contact points of the object based on the grasp plan. The controllable arm 104 may continue following the planned trajectory to move the object to a new position based on the grasp plan. In some embodiments, the grasp planner 302 may determine trajectories of the controllable arm 104 using a Random-exploring Rapid Tree (RRT) algorithm Additionally, in some embodiments, the grasp planner 302 may reconstruct or estimate surfaces of the object, which may be presenting unknown, using assumptions of symmetry to plan the manipulation actions. For example, in some embodiments, the unobserved parts of the modeled object may be estimated and small gaps of the modeled object that may be impossible or to be captured by the depth camera 106 due to self-occlusion may be automatically filled using the Power Crust or Cocone algorithms.

The table controller 304 is configured to control the movement (e.g., rotation) of the modeling table 102. The table controller 304 controls the rotation angle of the modeling table 102 along the same plane to rotate the object with respect to the depth camera 106. That is, the rotation of the modeling table 102 allows the depth camera 106 to capture additional surfaces of the object repositioning the object on the modeling table 102. In addition to the rotation of the modeling table 102, the depth camera 106 may move relative to the modeled object to capture more surfaces of the modeled object without repositioning the modeled object. For example, an angle of the depth camera 106 and/or a distance between the modeled object and the depth camera 106 may be controlled by moving the controllable arm 104.

The arm controller 306 is configured to control the movement of the controllable arm 104 based on the determined grasp plan discussed above. For example, the arm controller 306 is configured to control the controllable arm 104 to reposition the object on the modeling table 102 to a new position such that any occluded surfaces are viewable by the depth camera 106. In the illustrative embodiment, the arm controller 306 may also control the controllable arm 104 to move an object from an input area or bin 120 to the modeling table 102 and/or remove an object from the modeling table 102 to an output area or bin 122 after generation of the 3D model of the object. To do so, the arm controller 306 includes a manipulator controller 320, which is configured to control the movement of the manipulator 242 to grasp an object. Additionally, the arm controller 306 is further configured to control the position and angle of the depth camera 106 by moving the controllable arm 104. The arm controller 306 moves the depth camera 106 relative to the modeled object on the modeling table 102 in order to capture as many surfaces of the modeled object as possible without repositioning the object on the modeling table 102.

The image capturer 308 is configured to capture depth images of the modeled object while the modeled object is positioned on the modeling table 102 using the depth camera 106. It should be appreciated that an image captured by the depth camera 106 includes a depth channel or information. In the illustrative embodiment, the depth image produced by the depth camera 106 is embodied as a point cloud. However, in other embodiments, a point cloud may be determined from the depth images produced by the depth camera 106. In some embodiments, the image capturer 308 may also capture depth images of the input area or bin 120 to identify or determine a next object to be modeled. Additionally, the image capturer 308 may capture depth images of the output area or bin 122 to identify or determine a placement location of the output area where the modeled object on the modeling table 102 is to be moved after producing the 3D model.

The mass data manager 310 is configured to determine the mass data and inertia data of the object. To do so, the mass data manager 310 includes a mass determiner 330, a center of mass determiner 332, and an inertia determiner 334. The mass determiner 330 is configured to determine the mass data of the object indicative of the mass of the modeled object based on the mass sensor data received from the mass sensor 232 of the modeling table 102. The mass data may be represented by a raw mass value that defines the determined mass of the object.

The center of mass determiner 332 is configured to determine an estimated center of mass based on the force-torque sensor data received from the force-torque sensor 244 and the movements of the object. That is, by moving the object using the controllable arm 104, the controller 110 may determine the location of the center of mass of the object. As discussed in more detail below, such determination may be made during the normal movements of the object, such as when the object is repositioned on the moveable table 102. Additionally, the controllable arm 104 may be used to move the object around for the purpose of refining or determining the center of mass of the object.

Similar to the center of mass determiner 332, the inertia determiner 334 is configured to determine inertia data of the modeled object based on the force-torque sensor data received from the force-torque sensor 244 and the movements of the object. In the illustrative embodiment, the inertia data is embodied as an inertia matrix (e.g., an inertia tensor matrix) that defines an inertia of the object. As discussed above, the determination of the inertia data may occur during the normal movements of the object and/or during while moving the object around specifically for the determination of the inertia data. It should be appreciated that, as discussed in detail below, the mass data and inertia data of the object are append to, or incorporated in, the final 3D model.

The model manager 312 is configured to produce and update a 3D model of the modelled object based on the depth images captured by the depth camera 106. In the illustrative embodiment, the point cloud model generated based on the depth images of the modeled object is converted to a 3D mesh model that includes the mass and inertia data. To do so, the model manager 312 includes a point cloud manager 340, a 3D mesh modeler 342, and a data appender 344.

The point cloud manager 340 is configured to produce and update the point cloud model. Because an image captured by the depth camera 106 is embodied as a depth image (i.e., the depth image itself is embodied as a point cloud), the initial depth image of the object produces a present point cloud model of the modeled object. The point cloud manager 340 updates the present point cloud model by adding subsequent point clouds (i.e., subsequent depth images) to the present point cloud model. To do so, the point cloud manager 340 includes an image segmenter 350, an image aligner 352, and an image aggregator 354. The image segmenter 350 is configured to segment the captured depth images to remove background structures from the depth image. In the illustrative embodiments, the image segmenter 350 is configured to remove any image segments that are not relevant to the object being modeled. For example, extraneous background structures (e.g., the moveable table 102) may be captured in the depth image. Such background structures are removed from the depth image before aggregating it into the point cloud model. To do so, the image segmenter 350 may apply a bounding box around the object representation in the depth image to remove any undesired background structures or other unusable or unneeded features captured in the depth image.

The image aligner 352 is configured to align the segmented depth image with the present point cloud model. In other words, if a subsequent depth image has been taken from a different camera viewpoint compared to the other point cloud images, the subsequent depth image may need to be aligned with the present point cloud model.

After removing background structures and aligning the present depth image with the point cloud model, the image aggregator 354 is configured to aggregate the aligned segmented depth image with the present point cloud model to generate an updated point cloud model. The point cloud manager may repeat this process for each depth image of the object captured by the depth camera 106 until a final point cloud model is established.

Once a point cloud model of the object is finalized, the 3D mesh modeler 342 is configured to generate a 3D mesh model of the modeled object by converting the point cloud model to a 3D mesh model. For example, in some embodiments, the final point cloud model is converted to a 3D mesh model using algorithms that produce watertight models, such as Power Crust or Cocone algorithms. In other embodiments, the mesh model can be obtained by triangulation of the point cloud model using Delaunay triangulation. It should be appreciated that such meshing algorithms may be determined based on the type of object being modeled, the present point cloud model, and/or other criteria.

The data appender 344 is configured to append mass data, the estimated center of mass of the object, and the inertia data of the modeled object as determined by the mass data manager to the 3D mesh model to produce an augmented 3D mesh model. It should be appreciated that the addition of the appended data enriches the 3D mesh model with the additional information of the mass value, estimated center of mass, and estimated inertia data. The appended data may be useful in subsequent analysis and/or replication processes, for example, to detect anomalies that are not visible by analyzing content level and mass density distribution of the modeled object.

The point cloud model data 314 stores the depth images generated by the depth camera 106 and the point cloud model generated by aggregation of the depth images (e.g., the aggregation of point clouds). The 3D model data 316 stores the generated 3D mesh model of the modeled object, which includes the mass and inertia data as discussed above.

Figure 4:
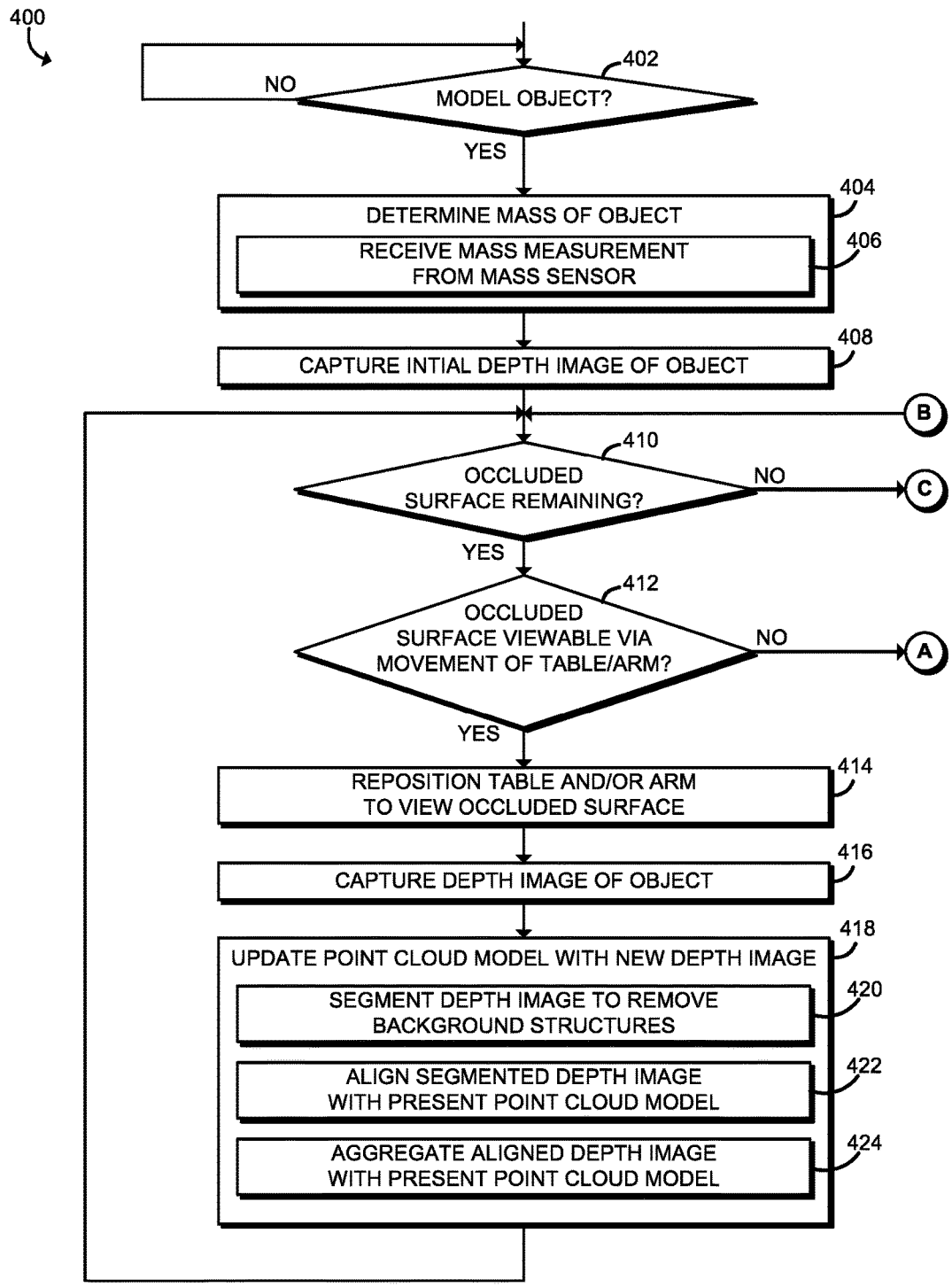
FIGS. 4-6 are a simplified flow diagram of at least one embodiment of a method for autonomously modeling an object that may be performed by the autonomous object modeler of FIGS. 1-3.
Figure 5:
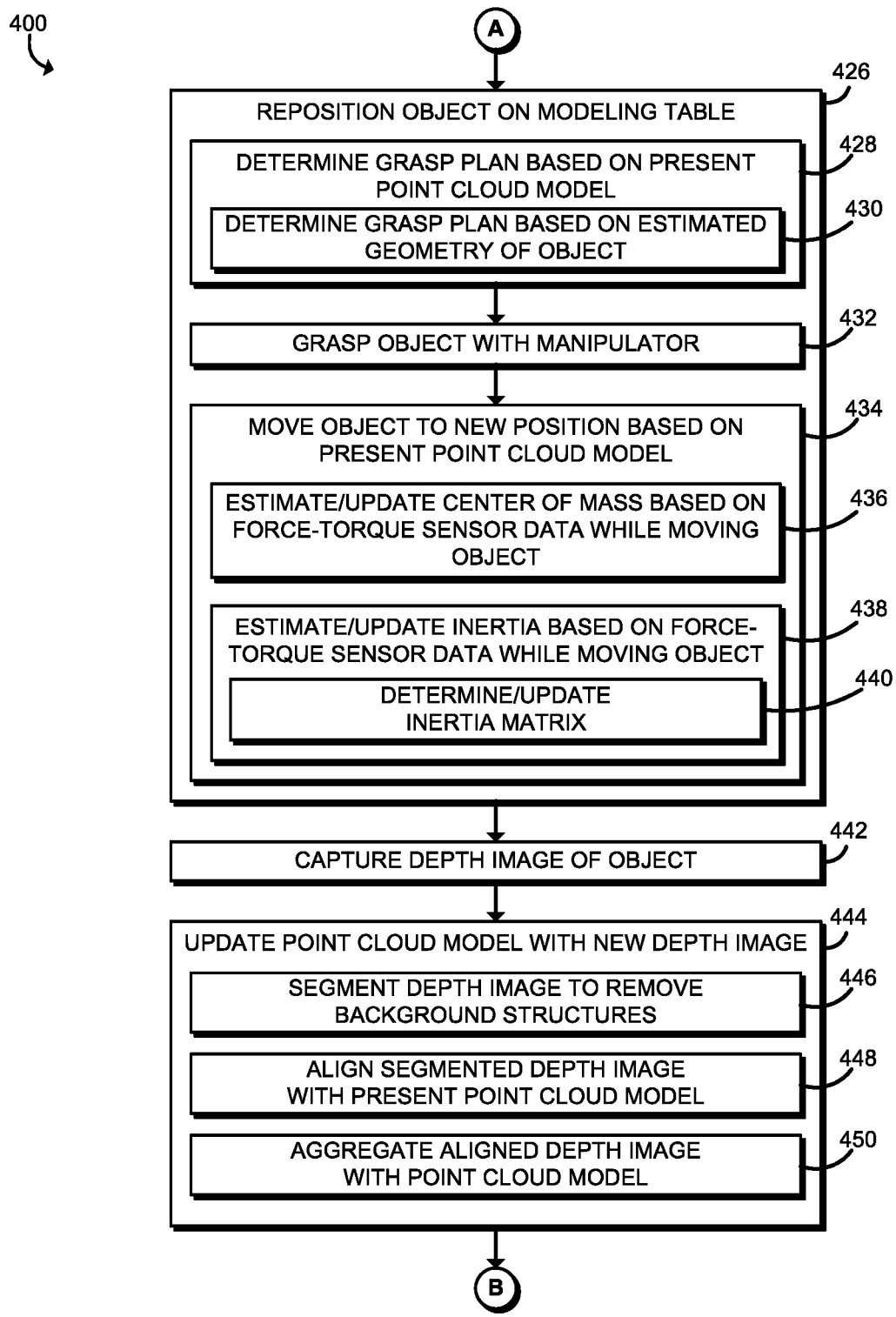
Figure 6:
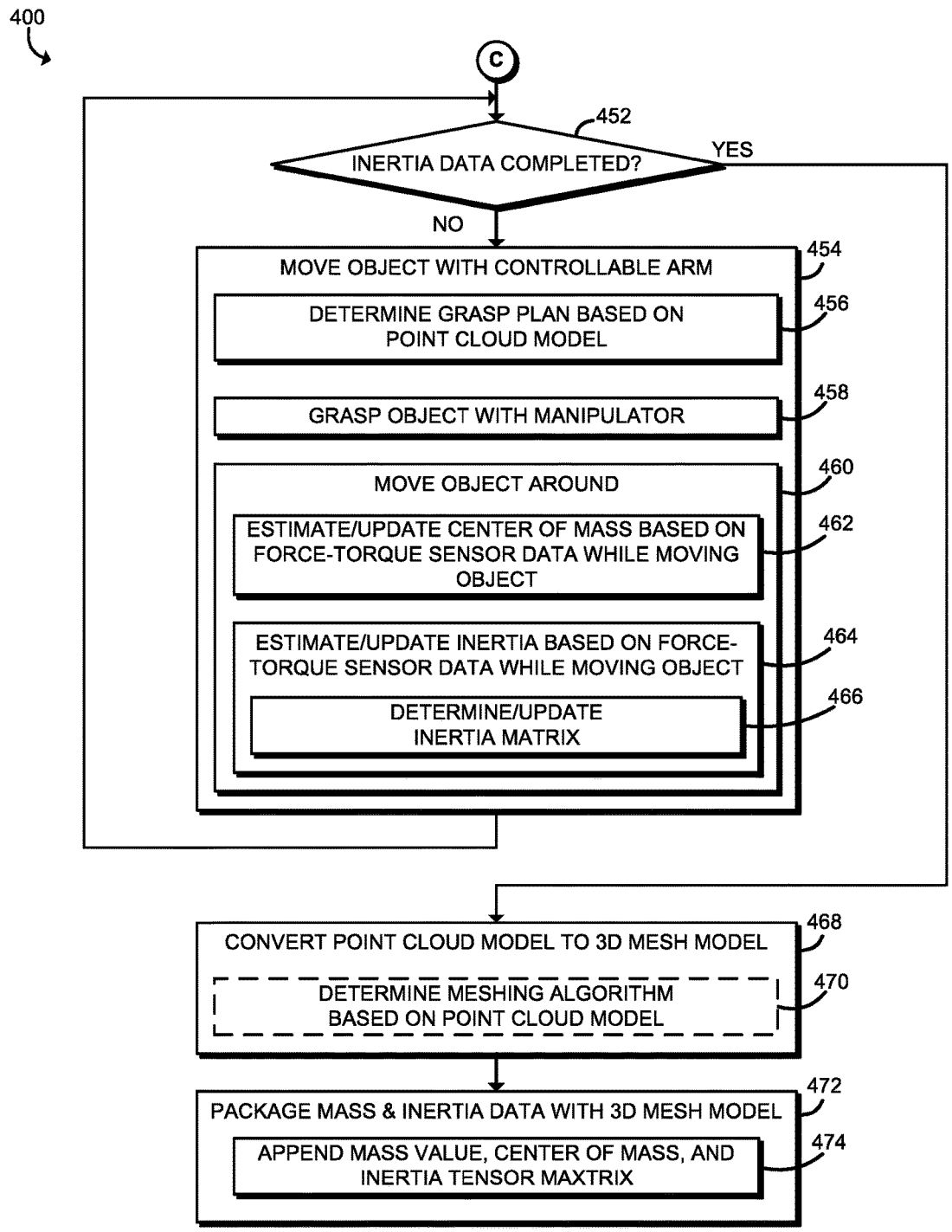

Referring now to FIGS. 4-6, in use, the controller 110 may execute a method 400 for autonomously modeling an object. The illustrative method 400 begins with block 402 in which the controller 110 determines whether to model an object placed on the modeling table 102. If not, the method 400 loops back to block 402 to continue determining whether to model an object. If, however, the controller 110 determines to model an object located on the modeling table 102, the method 400 advances to block 404.

In block 404, the controller 110 determines a mass of the object. To do so, the controller 110 receives a mass measurement or mass sensor data received from the mass sensor 232 and determines the mass value of the object based on the mass sensor data. Subsequently, in block 408, the controller 110 captures an initial depth image of the object.

In block 410, the controller 110 determines whether there any occluded surfaces remain un-modeled (i.e., uncaptured by the depth camera 106). To do so, the controller 110 may analyze the initial image of the object captured in block 408 and/or the present point cloud model (i.e., after subject iterations of blocks 410-424 discussed below). If the controller 110 determines there are no remaining occluded surfaces, the method 400 skips ahead to block 452 of FIG. 6 discussed below. If, however, the controller 110 determines there is one or more occluded surfaces remaining un-modeled, the method 400 advances to block 412.

In block 412, the controller 110 determines whether the presently occluded surface is viewable by the depth camera 106 via movement of the modeling table 102 and/or the controllable arm 104. In other words, the controller 110 determines whether the occluded surface of the object can be viewed by simply rotating the modeling table 102 and/or moving the controllable arm 104 so as to reposition the depth camera 106 without repositioning the object on the modeling table 102. If the controller 110 determines that the occluded surface cannot be viewed by only movement of the modeling table 102 and/or the depth camera 106, the method 400 advances to block 426 of FIG. 5 to reposition the object on the modeling table 102 as discussed below. If, however, the controller 110 determines that the occluded surface can be viewed by the depth camera 106 by moving the modeling table 102 and/or the controllable arm 104, the method 400 advances to block 414.

In block 414, the controller 110 reposition the modeling table 102 and/or the controllable arm 104 to view the occluded surface, and captures the depth image of the modeled object that includes the previously occluded surface in block 416.

In block 418, the controller 110 updates a present point cloud model with a new depth image captured in block 416. If only one depth image has been captured (i.e., it is the first iteration of block 418), the depth image is used as the initial point cloud model. However, during subsequent iterations of block 418, the present point cloud model is updated with each new depth image captured by the depth camera 106. Because any new depth image may be captured from a different camera viewpoint of the object relative to the present point cloud model, the controller 110 processes the new depth image prior to aggregating the new depth image with the present point cloud model. To do so, in block 420, the controller 110 segments the new depth image to remove background structures and/or unnecessary structures or object from the new depth image. Subsequently, in block 422, the controller 110 aligns the segmented depth image with the present point cloud model. In block 424, the controller 110 aggregates the aligned, segmented depth image with the present point cloud model to generate an updated point cloud model. After the point cloud has been updated with the new depth image, the method 400 loops back to block in which the controller 110 again determines whether there are any remaining occluded surfaces of the object.

Referring back to block 412, if the controller determines that an occluded surface cannot be properly viewed by only movement of the modeling table 102 and/or the depth camera 106, the method 400 advances to block 426 of FIG. 5. In block 426, the controller 110 repositions the object on the modeling table 102 such that the occluded surface is viewable by the depth camera 106 in the new position. To do so, the controller 110 determines a grasp plan based on the present point cloud model of the object in block 428. As discussed above, the grasp plan is generated so as to determine how to control the controllable arm 104 to grasp the modeled object. The grasp plan may indicate, for example, the best contact points or area of the object to be grasped by the manipulator 242. Additionally, as discussed above, the grasp plan may include an exact trajectory of the controllable arm 104 required to reposition the object to the new position. Because portions of the point cloud model may be un-modeled or otherwise unknown (e.g., due to the occluded surface), the controller 110 may estimate the geometry of the object (e.g., the geometry of the occluded surfaces) and determine the grasp plan based on the estimated geometry. For example, if the controller 110 determines that the estimated geometry of the modeled object is a cube, the controller 110 may control the controllable arm 104 to grasp the modeled object by two opposite, flat surfaces.

Subsequently, in block 432, the controller 110 grasps the modeled object with the manipulator 242 using the grasp plan to control the controllable arm 104 and moves the object to the new position based on the present point cloud model in block 434. While moving the object to the new position, the controller 110 estimates or updates the center of mass of the object in block 436. To do so, the controller 110 estimates/updates the center of mass determination based on the force-torque sensor data received from the force-torque sensor(s) 244, which is indicative of an inertia of the object. For example, based on the amount of torque applied to the controllable arm 104 while the object is held and/or moved, the controller 110 may estimate the location of the center of mass of the object. In a similar manner, the controller also estimates the inertia of the object while moving the object to the new position in block 438. To do so, in the illustrative embodiment, the controller 110 determines or updates an inertia matrix in block 440. The inertia matrix provides an indication of the inertia of the object and may be estimated based on the measurement of torque applied by the object to the manipulator 242 while the object is held and/or moved. In some embodiments, the inertia matrix may be embodied as an inertia tensor matrix.

After the object has been moved to the new position on the modeling table 102, the controller 110 captures a new depth image of the object in the new position in block 442. In block 444, the controller 110 updates the point cloud model with the new depth image. To do so, as discussed above, the controller 110 segments the new depth image to remove background structures in block 446, aligns the segmented depth image with the present point cloud model in block 448, and aggregates the aligned, segmented depth image with the present point cloud model to generate an updated point cloud model in block 450. Subsequent to updating the point cloud model, the method 400 loops back to block 410 of FIG. 4 in which the controller 110 again determines whether there are any remaining occluded surfaces of the object.

If, in block 410, the controller 110 determines there are no remaining occluded surfaces (i.e., there are no un-modeled surfaces of the object), the method 400 advances to block 452 of FIG. 6. In block 452, the controller 110 determines whether the determination of the inertia data is complete. That is, in some cases, the controller 110 may be able to determine the estimated center of mass of the object and the inertia matrix based on the movements of the object to the new positions for the depth image capturing process. However, in other cases, the controller 110 may not be able to fully determine the inertia data based on such movements. For example, in those situations wherein the object does not need to be repositioned many times, the controller 110 may not have enough time or data to fully determine the movement estimated center of mass of the object and the inertia matrix.

If the controller 110 determines that the inertia data of the object is completed, the method 400 advances to block 468 to generate the 3D mesh model as discussed below. If, however, the controller 110 determines that the inertia data of the object is not completed, the method 400 advances to block 454. In block 454, the controller 110 moves the modeled object with a controllable arm 104. To do so, in block 456, the controller 110 determines a grasp plan based on the point cloud model to determine the best contact points or area of the modeled object to be grasped, as well as a planned movement trajectory.

Subsequently, in block 458, the controller 110 grasps the object with the manipulator 242 using the grasp plan to control the controllable arm 104 and moves the object around in block 460. The controller 110 may move the object in any trajectory or manner that is helpful in determining the estimated center of mass and/or inertia of the object. While moving the object around, the controller 110 estimates or updates the center of mass of the object in block 462. As discussed above, the controller may estimate the location of the center of mass of the object based on force-torque sensor data received from the force-torque sensor 244 while the object is being moved by the controllable arm 104. Similarly, in block 464, the controller 110 estimates or updates the inertia data based on the force-torque sensor data while the object is being moved by the controllable arm 104. To do so, the controller 110 further determines and updates the inertia matrix in block 466.

After the controller 110 has updated the estimated center of mass and inertia of the object, the method 400 loops back to block 452 to continue to determine whether the inertia data is completed. If not, the method 400 advances again to block 454 in which the controller 110 may move the object around further to finalize the determination of the center of mass and inertia of the object. If, however, the controller 110 determines that the inertia data is complete, the method advances to block 468. In block 468, the controller 110 converts the point cloud model to a 3D mesh model. To do so, in some embodiments, the controller 110 may determine a meshing algorithm to be used based on the point cloud model in block 470 so as to optimize or improve the conversation of the point cloud model to the 3D mesh model.

Subsequently, in block 472, the controller 110 packages the mass and inertia data with the 3D mesh model. To do so, the controller 110 may append or incorporate the mass value, the center of mass, and the inertia matrix into or with the 3D mesh model to produce an augmented 3D model in block 474. For example, as shown in FIG. 7, the mass and inertia data may be represented by a software description 700, which may be appended to a 3D mesh model. Specifically, FIG. 7 illustrates an example representation of the mass data, the center of mass, and the inertia matrix in XML COLLADA format.

Figure 8:
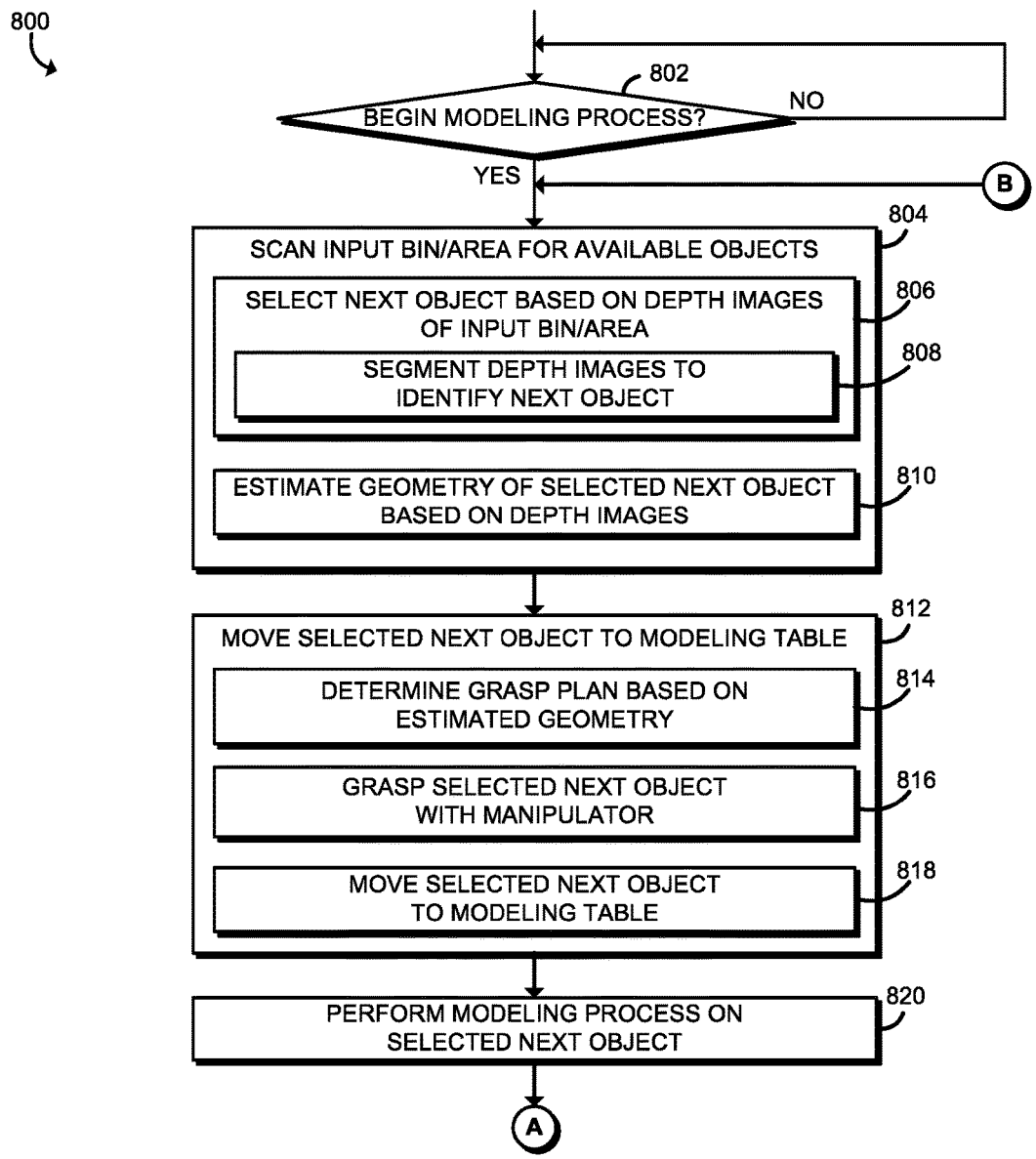
FIGS. 8 and 9 are a simplified flow diagram of at least one embodiment of a method for autonomously modeling multiple objects that may be performed by the autonomous object modeler of FIGS. 1-3.
Figure 9:
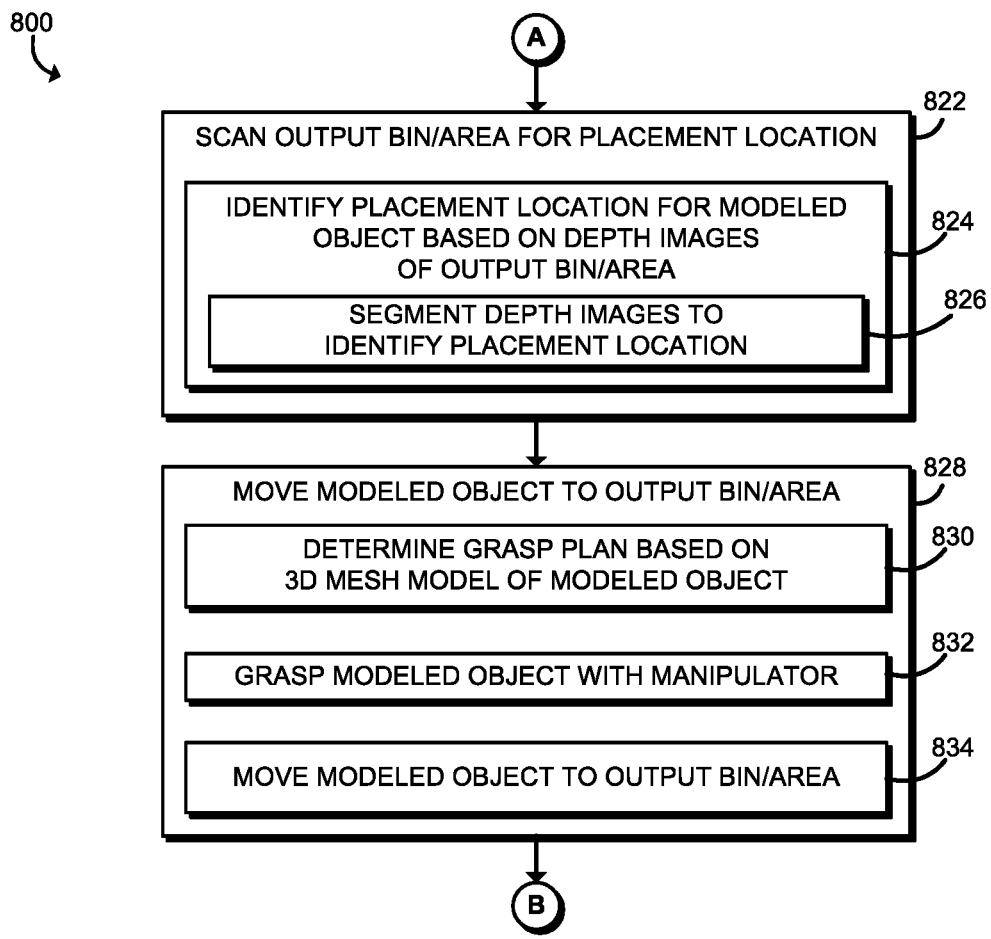

Referring now to FIGS. 8 and 9, in use, the controller 110 may execute a method 800 for autonomously modeling multiple objects. The illustrative method 800 begins with block 802 in which the controller 110 determines whether to begin a modeling process. For example, as discussed above in regard to FIG. 1, the autonomous object modeler 100 may include an input area or bin 120 for housing available objects and an output bin or area 122 for housing objects that have been previously modeled. In such embodiments, the controller 110 may determine whether to begin a modeling process to autonomously model available objects in the input bin 120. If the controller 110 determines not to begin a modeling process, the method 800 loops back to block 802 to continue determining whether to begin the modeling process. If, however, the controller 110 determines to begin the modeling process, the method 800 advances to block 804.

In block 804, the controller 110 scans the input bin 120 for available objects. To do so, in block 806, the controller 110 selects next object based on the depth images of the input bin 120 produced by the depth camera 106. In block 808, the controller 110 further segments the captured depth images of the input bin or area to identify the next object to be modeled. After selecting the next object, the controller 110 estimates the geometry of the selected next object based on the depth images of the object in block 810.

In block 812, the controller 110 moves the selected next object to the modeling table 102. To do so, the controller 110 determines a grasp plan based on the estimated geometry in block 814, grasps the next object with the manipulator 242 based on the grasp plan in block 816, and moves the selected next object to the modeling table 102 based on the grasp plan in block 818. In block 820, the controller 110 performs the modeling process on the selected next object as described above in regard to the method 400 of FIGS. 4-6.

After the object has been modeled in block 820, the method 800 advances to block 822 of FIG. 9. In block 822, the controller 110 scans the output bin 122 for a placement location for the modeled object. To do so, in block 824, the controller 110 identifies a placement location for modeled object based on the depth images of the output bin 122 produced by the depth camera 106. The controller 110 segments the depth images to identify the placement location to place the modeled object from the modeling table 102 in block 826.

In block 828, the controller 110 moves the modeled object to the output bin 122. To do so, the controller 110 determines a grasp plan based on a 3D mesh model of the modeled object in block 830. The controller 110 grasps the modeled object on the modeling table with the manipulator 242 based on the grasp plan in block 832 and moves the modeled object to the identified placement location of the output bin or area in block 834. The method 800 subsequently loops back to block 804 to continue scanning input bin or area for available objects.

EXAMPLES

Illustrative examples of the technologies disclosed herein are provided below. An embodiment of the technologies may include any one or more, and any combination of, the examples described below.

Example 1-1 includes an object modeler for autonomously modeling an object. The object modeler includes a modeling table having a mass sensor to produce mass sensor data indicative of a mass of an object positioned on the modeling table; a controllable arm having a controllable manipulator to grasp and move the object, wherein the controllable arm includes a force-torque sensor to produce force-torque sensor data indicative of an inertia of the object while the object is moved by the controllable arm; a depth camera attached to the controller arm to capture depth images of the object; and a controller to control operation of the modeling table, the controllable arm, and the depth camera.

Example 2 includes the subject matter of Example 1, and wherein the controller is to generate a three-dimensional model of the object based on the depth images captured by the depth camera, wherein the three-dimensional model includes (i) mass data indicative of the mass of the object, (ii) an estimated center of mass of the object, and (iii) an inertia matrix to the three-dimensional model.

Example 3 includes the subject matter of Example 1 or 2, and wherein the controller is to determine mass data indicative of the mass of the object based on the mass sensor data received from the mass sensor; control the depth camera to capture a depth image of the object while the object is positioned on the modeling table; determine whether a surface of the object is occluded from the depth camera; control the controllable arm to reposition the object on the modeling table to a new position at which the occluded surface is viewable by the depth camera; determine inertia data of the object based on the force-torque sensor data while the object is being repositioned by the controllable arm; control the depth camera to capture a subsequent depth image of the object while in the new position; generate a three-dimensional model of the object based on the captured depth images of the object; and append the mass data and inertia data to the three-dimensional model.

Example 4 includes the subject matter of any of Examples 1-3, and wherein the depth camera comprises a Red-Green-Blue-Depth (RGBD) camera.

Example 5 includes the subject matter of any of Examples 1-4, and wherein to determine whether a surface of the object is occluded comprises to analyze a present point cloud model of the object for un-modeled surfaces.

Example 6 includes the subject matter of any of Examples 1-5, and wherein to control the controllable arm to reposition the object on the modeling table comprises to determine a grasp plan for the controllable arm based on a present point cloud model of the object, wherein the grasp plan defines movements of the controller arm required for the controller arm to grasp and move the object to the new position; control the controllable manipulator to grasp the object based on the grasp plan; and control the controllable arm to move the object to the new position based on the grasp plan.

Example 7 includes the subject matter of any of Examples 1-6, and wherein to determine the inertia data comprises to determine an estimated center of mass of the object based on the force-torque sensor data and the movements of the object.

Example 8 includes the subject matter of any of Examples 1-7, and wherein to determine the inertia data comprises to determine an inertia matrix based on the force-torque sensor data and the movements of the object, wherein the inertia matrix defines an inertia of the object.

Example 9 includes the subject matter of any of Examples 1-8, and wherein to generate the three-dimensional model comprises to convert a point cloud model generated based on the depth images of the object to a three-dimensional mesh model.

Example 10 includes the subject matter of any of Examples 1-9, and wherein to append the mass data and inertia data comprises to append mass data indicative of the mass of the object, an estimated center of mass of the object, and an inertia matrix that defines an inertia of the object to the three-dimensional model.

Example 11 includes the subject matter of any of Examples 1-10, and wherein the controller is further to update a present point cloud model of the object based on the subsequent depth image of the object.

Example 12 includes the subject matter of any of Examples 1-11, and wherein to update the present point cloud model comprises to segment the subsequent depth image to remove background structures form the subsequent depth image; align the segmented subsequent depth image with the present point cloud image; and aggregate the aligned subsequent depth image with the point cloud model to generate an updated point cloud model.

Example 13 includes the subject matter of any of Examples 1-12, and wherein the controller is further to determine whether determination of the inertia data is completed; control the controllable arm to move the object in response to a determination that the determination of the inertia data is not completed; determine additional inertia data of the object while the object is being moved by the controllable arm; and update the inertia data with the additional inertia data.

Example 14 includes the subject matter of any of Examples 1-13, and wherein the controller is further to control the controllable arm to move the object from the modeling table to an output area after generation of the three-dimensional model of the object; and control the controllable arm to move a subsequent object from an input area to the modeling table.

Example 15 includes a method for autonomously modeling an object. The method includes determining, by an object modeler, mass data indicative of a mass of the object while the object is positioned on a modeling table of the object modeler; capturing, by a depth camera of the object modeler, a depth image of the object; determining, by the object modeler, whether a surface of the object is occluded from the depth camera; repositioning, by a controllable arm of the object modeler, the object on the modeling table to a new position at which the occluded surface is viewable by the depth camera; determining, by the object modeler, inertia data of the object while the object is being repositioned by the controllable arm; capturing, by the depth camera the object modeler, a subsequent depth image of the object while in the new position; generating, by the object modeler, a three-dimensional model of the object based on the captured depth images of the object; and appending, by the object modeler, the mass data and inertia data to the three-dimensional model.

Example 16 includes the subject matter of Example 15, and wherein determining the mass data comprises receiving, by a controller of the object modeler and from a weight sensor of the modeling table, sensor data indicative of the mass of the object while the object is positioned on the modeling table; and determining, by the controller, the mass data based on the sensor data.

Example 17 includes the subject matter of Examples 15 or 16, and wherein the depth camera comprises a Red-Green-Blue-Depth (RGBD) camera.

Example 18 includes the subject matter of any of Examples 15-17, and wherein determining whether a surface of the object is occluded comprises analyzing a present point cloud model of the object for un-modeled surfaces.

Example 19 includes the subject matter of any of Examples 15-18, and wherein repositioning the object on the modeling table comprises determining, by a controller of the object modeler, a grasp plan for the controllable arm based on a present point cloud model of the object, wherein the grasp plan defines movements of the controller arm required for the controller arm to grasp and move the object to the new position; grasping, by a manipulator of the controllable arm, the object based on the grasp plan; and moving, by the controller arm, the object to the new position based on the grasp plan.

Example 20 includes the subject matter of any of Examples 15-19, and wherein determining inertia data comprises receiving, by a controller of the object modeler and from a force-torque sensor of the controllable arm, force-torque sensor data indicative of a torque of the controller arm while performing movements of the object with the controllable arm; and determining, by the controller, an estimated center of mass of the object based on the force-torque sensor data and the movements of the object.

Example 21 includes the subject matter of any of Examples 15-20, and further includes determining, by the controller, an inertia matrix based on the force-torque sensor data and the movements of the object, wherein the inertia matrix defines an inertia of the object.

Example 22 includes the subject matter of any of Examples 15-21, and wherein generating the three-dimensional model comprises converting, by a controller of the object modeler, a point cloud model generated based on the depth images of the object to a three-dimensional mesh model.

Example 23 includes the subject matter of any of Examples 15-22, and wherein appending the mass data and inertia data comprises appending mass data indicative of the mass of the object, an estimated center of mass of the object, and an inertia matrix that defines an inertia of the object to the three-dimensional model.

Example 24 includes the subject matter of any of Examples 15-23, and wherein determining the mass data comprises (i) receiving, by a controller of the object modeler and from a weight sensor of the modeling table, sensor data indicative of the mass of the object while the object is positioned on the modeling table and (ii) determining, by the controller, the mass data based on the sensor data; and determining inertia data comprises (i) receiving, by the controller and from a force-torque sensor of the controllable arm, force-torque sensor data indicative of a torque of the controller arm while performing movements of the object with the controllable arm, (ii) determining, by the controller, an estimated center of mass of the object based on the force-torque sensor data and the movements of the object, and (iii) determining, by the controller, an inertia matrix based on the force-torque sensor data and the movements of the object, wherein the inertia matrix defines an inertia of the object.

Example 25 includes the subject matter of any of Examples 15-24, and wherein appending the mass data and inertia data comprises appending the mass data, the estimated center of mass, and the inertia matrix to the three-dimensional model.

Example 26 includes the subject matter of any of Examples 15-25, and further includes updating a present point cloud model of the object based on the subsequent depth image of the object.

Example 27 includes the subject matter of any of Examples 15-26, and wherein updating the present point cloud model comprises segmenting the subsequent depth image to remove background structures form the subsequent depth image; aligning the segmented subsequent depth image with the present point cloud image; and aggregating the aligned subsequent depth image with the point cloud model to generate an updated point cloud model.

Example 28 includes the subject matter of any of Examples 15-27, and further including determining, by a controller, whether determination of the inertia data is completed; moving the object by the controllable arm of the object modeler in response to a determination that the determination of the inertia data is not completed; determining, by the controller, additional inertia data of the object while the object is being moved by the controllable arm; and updating, by the controller, the inertia data with the additional inertia data.

Example 29 includes the subject matter of any of Examples 15-28, and further including moving, by the controllable arm, the object from the modeling table to an output area after generation of the three-dimensional model of the object; and moving, by the controllable arm, a subsequent object from an input area to the modeling table.

Example 30 includes one or more machine-readable storage media comprising a plurality of instructions stored thereon that, when executed, causes a controller of an object modeler to perform the method of any of claims Examples 15-29.

Example 31 includes an object modeler for autonomously modeling an object, The object modeler includes a depth camera to capture a depth image of an object while the object is positioned on a modeling table of the object modeler; means for determining mass data indicative of a mass of the object; means for determining whether a surface of the object is occluded from the depth camera; means for repositioning, the object on the modeling table to a new position at which the occluded surface is viewable by the depth camera; means for determining inertia data of the object while the object is being repositioned by the controllable arm; means for capturing a subsequent depth image of the object while in the new position; means for generating a three-dimensional model of the object based on the captured depth images of the object; and means for appending the mass data and inertia data to the three-dimensional model.

Example 32 includes the subject matter of Example 31, and wherein the means for determining the mass data comprises means for receiving sensor data indicative of the mass of the object while the object is positioned on the modeling table; and means for determining the mass data based on the sensor data.

Example 33 includes the subject matter of Examples 31 or 32, and wherein the depth camera comprises a Red-Green-Blue-Depth (RGBD) camera.

Example 34 includes the subject matter of Examples 31-33, and wherein the means for determining whether a surface of the object is occluded comprises means for analyzing a present point cloud model of the object for un-modeled surfaces.

Example 34 includes the subject matter of Examples 31-33, and wherein the means for repositioning the object on the modeling table comprises means for determining a grasp plan for the controllable arm based on a present point cloud model of the object, wherein the grasp plan defines movements of the controller arm required for the controller arm to grasp and move the object to the new position; means for grasping the object based on the grasp plan; and means for moving the object to the new position based on the grasp plan.

Example 34 includes the subject matter of Examples 31-33, and wherein the means for determining inertia data comprises means for receiving force-torque sensor data indicative of a torque of the controller arm while performing movements of the object with the controllable arm; and means for determining an estimated center of mass of the object based on the force-torque sensor data and the movements of the object.

Example 34 includes the subject matter of Examples 31-33, and further includes means for determining an inertia matrix based on the force-torque sensor data and the movements of the object, wherein the inertia matrix defines an inertia of the object.

Example 34 includes the subject matter of Examples 31-33, and wherein the means for generating the three-dimensional model comprises means for converting a point cloud model generated based on the depth images of the object to a three-dimensional mesh model.

Example 34 includes the subject matter of Examples 31-33, and wherein the means for appending the mass data and inertia data comprises means for appending mass data indicative of the mass of the object, an estimated center of mass of the object, and an inertia matrix that defines an inertia of the object to the three-dimensional model.

Example 34 includes the subject matter of Examples 31-33, and wherein the means for determining the mass data comprises (i) means for receiving sensor data indicative of the mass of the object while the object is positioned on the modeling table and (ii) means for determining the mass data based on the sensor data; and the means for determining inertia data comprises (i) means for receiving force-torque sensor data indicative of a torque of the controller arm while performing movements of the object with the controllable arm, (ii) means for determining an estimated center of mass of the object based on the force-torque sensor data and the movements of the object, and (iii) means for determining an inertia matrix based on the force-torque sensor data and the movements of the object, wherein the inertia matrix defines an inertia of the object.

Example 34 includes the subject matter of Examples 31-33, and wherein the means for appending the mass data and inertia data comprises means for appending the mass data, the estimated center of mass, and the inertia matrix to the three-dimensional model.

Example 34 includes the subject matter of Examples 31-33, and further includes means for updating a present point cloud model of the object based on the subsequent depth image of the object.

Example 34 includes the subject matter of Examples 31-33, and wherein the means for updating the present point cloud model comprises means for segmenting the subsequent depth image to remove background structures form the subsequent depth image; means for aligning the segmented subsequent depth image with the present point cloud image; and means for aggregating the aligned subsequent depth image with the point cloud model to generate an updated point cloud model.

Example 34 includes the subject matter of Examples 31-33, and further includes means for determining whether determination of the inertia data is completed; means for moving the object in response to a determination that the determination of the inertia data is not completed; means for determining additional inertia data of the object while the object is being moved by the controllable arm; and means for updating the inertia data with the additional inertia data.

Example 34 includes the subject matter of Examples 31-33, and further includes means for moving the object from the modeling table to an output area after generation of the three-dimensional model of the object; and means for moving a subsequent object from an input area to the modeling table.

The invention claimed is:

1. An object modeler for autonomously modeling an object, the object modeler comprising:
a modeling table having a mass sensor to produce mass sensor data indicative of a mass of an object positioned on the modeling table;
a controllable arm having a controllable manipulator to grasp and move the object, wherein the controllable arm includes a force-torque sensor to produce force-torque sensor data indicative of an inertia of the object while the object is moved by the controllable arm;
a depth camera attached to the controller arm to capture depth images of the object; and
a controller to control operation of the modeling table, the controllable arm, and the depth camera.

2. The object modeler of claim 1, wherein the controller is to generate a three-dimensional model of the object based on the depth images captured by the depth camera, wherein the three-dimensional model includes (i) mass data indicative of the mass of the object, (ii) an estimated center of mass of the object, and (iii) an inertia matrix to the three-dimensional model.

3. The object modeler of claim 1, wherein the controller is to:
determine mass data indicative of the mass of the object based on the mass sensor data received from the mass sensor;
control the depth camera to capture a depth image of the object while the object is positioned on the modeling table;
determine whether a surface of the object is occluded from the depth camera;
control the controllable arm to reposition the object on the modeling table to a new position at which the occluded surface is viewable by the depth camera;
determine inertia data of the object based on the force-torque sensor data while the object is being repositioned by the controllable arm;
control the depth camera to capture a subsequent depth image of the object while in the new position;
generate a three-dimensional model of the object based on the captured depth images of the object; and
append the mass data and inertia data to the three-dimensional model.

4. The object modeler of claim 3, wherein to control the controllable arm to reposition the object on the modeling table comprises to:
determine a grasp plan for the controllable arm based on a present point cloud model of the object, wherein the grasp plan defines movements of the controller arm required for the controller arm to grasp and move the object to the new position;
control the controllable manipulator to grasp the object based on the grasp plan; and
control the controllable arm to move the object to the new position based on the grasp plan.

5. The object modeler of claim 3, wherein to determine the inertia data comprises to (i) determine an estimated center of mass of the object based on the force-torque sensor data and the movements of the object and (ii) determine an inertia matrix based on the force-torque sensor data and the movements of the object, wherein the inertia matrix defines an inertia of the object.

6. The object modeler of claim 3, wherein to generate the three-dimensional model comprises to convert a point cloud model generated based on the depth images of the object to a three-dimensional mesh model.

7. The object modeler of claim 3, wherein to append the mass data and inertia data comprises to append mass data indicative of the mass of the object, an estimated center of mass of the object, and an inertia matrix that defines an inertia of the object to the three-dimensional model.

8. The object modeler of claim 3, wherein the controller is further to:
   segment the subsequent depth image to remove background structures form the subsequent depth image;
   align the segmented subsequent depth image with the present point cloud model; and
   aggregate the aligned subsequent depth image with the point cloud model to generate an updated point cloud model.

9. The object modeler of claim 3, wherein the controller is further to:
   determine whether determination of the inertia data is completed;
   control the controllable arm to move the object in response to a determination that the determination of the inertia data is not completed;
   determine additional inertia data of the object while the object is being moved by the controllable arm; and
   update the inertia data with the additional inertia data.

10. A method for autonomously modeling an object, the method comprising:
    determining, by an object modeler, mass data indicative of a mass of the object while the object is positioned on a modeling table of the object modeler;
    capturing, by a depth camera of the object modeler, a depth image of the object;
    determining, by the object modeler, whether a surface of the object is occluded from the depth camera;
    repositioning, by a controllable arm of the object modeler, the object on the modeling table to a new position at which the occluded surface is viewable by the depth camera;
    determining, by the object modeler, inertia data of the object while the object is being repositioned by the controllable arm;
    capturing, by the depth camera the object modeler, a subsequent depth image of the object while in the new position;
    generating, by the object modeler, a three-dimensional model of the object based on the captured depth images of the object; and
    appending, by the object modeler, the mass data and inertia data to the three-dimensional model.

11. The method of claim 10, wherein determining the mass data comprises:
    receiving, by a controller of the object modeler and from a weight sensor of the modeling table, sensor data indicative of the mass of the object while the object is positioned on the modeling table; and
    determining, by the controller, the mass data based on the sensor data.

12. The method of claim 10, wherein repositioning the object on the modeling table comprises:
    determining, by a controller of the object modeler, a grasp plan for the controllable arm based on a present point cloud model of the object, wherein the grasp plan defines movements of the controller arm required for the controller arm to grasp and move the object to the new position;
    grasping, by a manipulator of the controllable arm, the object based on the grasp plan; and
    moving, by the controller arm, the object to the new position based on the grasp plan.

13. The method of claim 10, wherein determining inertia data comprises: receiving, by a controller of the object modeler and from a force-torque sensor of the controllable arm, force-torque sensor data indicative of a torque of the controller arm while performing movements of the object with the controllable arm; determining, by the controller, an estimated center of mass of the object based on the force-torque sensor data and the movements of the object; and determining, by the controller, an inertia matrix based on the force-torque sensor data and the movements of the object, wherein the inertia matrix defines an inertia of the object.

14. The method of claim 10, wherein appending the mass data and inertia data comprises appending mass data indicative of the mass of the object, an estimated center of mass of the object, and an inertia matrix that defines an inertia of the object to the three-dimensional model.

15. The method of claim 10, further comprising updating a present point cloud model of the object based on the subsequent depth image of the object.

16. The method of claim 15, wherein updating the present point cloud module comprises:
    segmenting the subsequent depth image to remove background structures form the subsequent depth image;
    aligning the segmented subsequent depth image with the present point cloud model; and
    aggregating the aligned subsequent depth image with the point cloud model to generate an updated point cloud model.

17. The method of claim 10, further comprising:
    determining, by a controller, whether determination of the inertia data is completed;
    moving the object by the controllable arm of the object modeler in response to a determination that the determination of the inertia data is not completed;
    determining, by the controller, additional inertia data of the object while the object is being moved by the controllable arm; and
    updating, by the controller, the inertia data with the additional inertia data.

18. One or more non-transitory, machine-readable storage media comprising a plurality of instructions stored thereon that, when executed, causes a controller of an object modeler to:
    determine mass data indicative of a mass of the object while the object is positioned on a modeling table of the object modeler;
    capture a depth image of the object;
    determine whether a surface of the object is occluded from the depth camera;
    reposition the object on the modeling table to a new position at which the occluded surface is viewable by the depth camera;
    determine inertia data of the object while the object is being repositioned by the controllable arm;
    capture a subsequent depth image of the object while in the new position;
    generate a three-dimensional model of the object based on the captured depth images of the object; and
    append the mass data and inertia data to the three-dimensional model.

19. The one or more non-transitory, machine-readable storage media of claim 18, wherein to determine the mass data comprises to:

receive, from a weight sensor of the modeling table, sensor data indicative of the mass of the object while the object is positioned on the modeling table; and determine the mass data based on the sensor data.

20. The one or more non-transitory, machine-readable storage media of claim 18, wherein to reposition the object on the modeling table comprises to:

determine a grasp plan for the controllable arm based on a present point cloud model of the object, wherein the grasp plan defines movements of the controller arm required for the controller arm to grasp and move the object to the new position;

grasp the object based on the grasp plan; and move the object to the new position based on the grasp plan.

21. The non-transitory, one or more machine-readable storage media of claim 18, wherein to determine inertia data comprises to: receive, from a force-torque sensor of the controllable arm, force-torque sensor data indicative of a torque of the controller arm while performing movements of the object with the controllable arm; determine an estimated center of mass of the object based on the force-torque sensor data and the movements of the object; and determine an inertia matrix based on the force-torque sensor data and the movements of the object, wherein the inertia matrix defines an inertia of the object.

22. The one or more non-transitory, machine-readable storage media of claim 18, wherein to append the mass data and inertia data comprises to append mass data indicative of the mass of the object, an estimated center of mass of the object, and an inertia matrix that defines an inertia of the object to the three-dimensional model.

23. The one or more non-transitory, machine-readable storage media of claim 18, wherein the plurality of instructions, when executed, further cause the object modeler to update a present point cloud model of the object based on the subsequent depth image of the object.

24. The one or more non-transitory, machine-readable storage media of claim 23, wherein to update the present point cloud module comprises to:

segment the subsequent depth image to remove background structures form the subsequent depth image;

align the segmented subsequent depth image with the present point cloud model; and aggregate the aligned subsequent depth image with the point cloud model to generate an updated point cloud model.

25. The one or more non-transitory, machine-readable storage media of claim 18, wherein the plurality of instructions, when executed, further cause the object modeler to:

determine whether determination of the inertia data is completed;

move, in response to a determination that the determination of the inertia data is not completed;

determine additional inertia data of the object while the object is being moved by the controllable arm; and update the inertia data with the additional inertia data.

* * * * *